US006184967B1

(12) United States Patent
Lagerwall et al.

(10) Patent No.: US 6,184,967 B1
(45) Date of Patent: Feb. 6, 2001

(54) PRESSURE-INSENSITIVE LIQUID CRYSTAL CELL

(75) Inventors: Sven T. Lagerwall, Göteborg (SE); Anatoli A. Muravski, Minsk (BY); Sergei Ye Yakovenko, Minsk (BY); Viktor A. Konovalov, Minsk (BY); Anatoli A. Minko, Minsk (BY); Valeri P. Tsarev, deceased, late of Minsk (BY), by Tatyana P. Tsareva, Vladimir V. Tsarev, Andrei P. Tsarev, legal representatives (73) Assignee: EMT AG, Stafa (CH)

(*) Notice: Under 35 U.S.C. 154(b), the term of this patent shall be extended for 0 days.

(21) Appl. No.: 08/849,338

(22) PCT Filed: Dec. 7, 1995

(86) PCT No.: PCT/SE95/01469
§ 371 Date: Nov. 25, 1997
§ 102(e) Date: Nov. 25, 1997

(87) PCT Pub. No.: WO96/18130
PCT Pub. Date: Jun. 13, 1996

(30) Foreign Application Priority Data

Dec. 9, 1994 (SE) .................................................. 9404303

(51) Int. Cl.$^7$ ..................... G02F 1/1339; G02F 1/1333; G02F 1/13

(52) U.S. Cl. ..................... 349/155; 349/157; 349/159; 349/172

(58) Field of Search ..................... 349/155, 156, 349/157, 158, 190, 171, 179

(56) References Cited

U.S. PATENT DOCUMENTS

| 4,150,878 | 4/1979 | Barzilai et al. ..................... 349/155 |
| 4,362,771 | 12/1982 | Umeda et al. . | |
| 4,653,865 | 3/1987 | Kando et al. ..................... 349/123 |
| 4,682,858 | 7/1987 | Kanbe et al. ..................... 349/155 |

(List continued on next page.)

FOREIGN PATENT DOCUMENTS

| 0407993A2 | 1/1991 | (EP) . |
| 0528397A2 | 2/1993 | (EP) . |
| WO92/06402 | 4/1992 | (WO) . |

OTHER PUBLICATIONS

"Ferroelectric Liquid Crystals: The Development of Devices", S.T. Lagerwall et al., *Ferroelectrics*, vol. 94, No. 3, (1989) pp. 3–62.

*Primary Examiner*—William L. Sikes
*Assistant Examiner*—Toan Ton
(74) *Attorney, Agent, or Firm*—Burns, Doane, Swecker & Mathis, L.L.P.

(57) ABSTRACT

The invention relates to an essentially pressure-insensitive liquid crystal cell. Electrode-equipped (5, 6) plates (1, 2) are arranged at a predetermined distance from each other and define a liquid crystal layer of a thickness d. At least a first (1) of the plates is transparent and has a thickness b not exceeding 1 mm, and a modulus of elasticity E. Spacers (11) fixed in the cavity and having a height h are distributed with a spacing L and have substantially the same modulus of elasticity E as said first plate. The spacers (11) have a width not exceeding 50 $\mu$m, at least in one direction. The degree of the surface coverage s by the supporting areas of the spacers (11) on said first plate (1) exceeds or is equal to a minimum value which is dependent on the type of liquid crystal. L is so selected in dependance on current values of d and b that, when applying a pressure P on the first plate (1), a maximum relative deflection $\Delta d/d$, caused by the pressure P on the first plate between the spacers satisfies condition (A): $\Delta d/d = PL^4/4Eb^3d \leq G$, where G is equal to the value of expression (B), representing a relative compression of the spacers caused by the same pressure P, for a case where the degree of surface coverage s assumes the above-mentioned minimum value (B): $\Delta h/h = P/sE$.

27 Claims, 3 Drawing Sheets

U.S. PATENT DOCUMENTS

| | | |
|---|---|---|
| 4,720,173 | 1/1988 | Okada et al. . |
| 5,044,733 | 9/1991 | Kamoi et al. . |
| 5,087,114 | 2/1992 | Fukui et al. .......................... 349/155 |
| 5,103,331 | 4/1992 | Taniguchi et al. . |
| 5,193,021 | 3/1993 | Kim . |
| 5,223,964 | 6/1993 | Nagano et al. . |
| 5,231,527 | 7/1993 | Takanashi et al. ................... 349/155 |
| 5,285,304 | 2/1994 | Hotta et al. . |
| 5,486,941 | 1/1996 | Saiuchi et al. ....................... 349/157 |

PRESSURE-INSENSITIVE LIQUID CRYSTAL CELL

The present invention generally relates to a liquid crystal cell, comprising two electrode-equipped plates which are arranged at a predetermined distance from each other to define an inner cavity, a liquid crystal layer sealed in said cavity, and spacers which are distributed in the cavity and the height of which corresponds to the thickness of said layer.

More specifically, the invention relates to such a liquid crystal cell as is substantially insensitive to external pressure.

BACKGROUND OF THE INVENTION

The present invention is especially useful in applications requiring a large active surface of the cell, such as displays, antiglare devices, welder's goggles etc. The background art and the advantages of the invention will therefore be described primarily with reference to displays, which thus should not be considered limitative of either the field of use of the invention or the inventive scope as defined in the appended claims.

Liquid crystal cells or displays of the type stated by way of introduction are well-known in the art. One or both plates are made of a transparent material, such as glass, and at least one of the electrode structures applied to the plates is also transparent. Moreover, there are traditionally orienting layers for aligning the molecules of the liquid crystal in the interface layer to the plates.

Under the influence of an applied electric field, the liquid crystal material can change its local orientation with respect to the direction of incident light, so as to affect the polarisation, absorption or scattering of transmitted or reflected light. By applying polarisers on one or both sides of the cell, the change of polarisation can be observed.

Normally, the optical effect is a function of the thickness of the liquid crystal layer, for which reason a local change of the thickness most often has a strong adverse effect on the performance of the display, which at worst may become completely useless due to variations of the thickness of the liquid crystal layer.

The most commonly used liquid crystal displays contain nematic or chiral nematic liquid crystals with positive dielectric anisotropy. In these displays, the optical axis of the liquid crystal material most often is parallel to the plates and, if so desired, twisted through the layer, most commonly through an angle of 90°. In this so-called waveguide mode, the polarisation of the incident light coincides or essentially coincides with one of the local elgenmodes of the system. When applying an electric field over the liquid crystal layer, the optic axis of the material reorients along the field with the result that the polarisation of the light is not affected by the liquid crystal.

In addition, liquid crystal displays can operate with a variety of other electro-optic effects which are not based on the waveguide mode and where the modulation of light is instead due to more general changes of the polarisation of the incident light. Displays whose optical properties are based on such effects are generally highly sensitive to thickness variations of the liquid crystal layer and, consequently, to changes in the mutual spacing of the plates.

The thickness of the liquid crystal layer generally affects not only the colour but also the voltage-contrast dependence of the cell, the maximum accessible contrast and other parameters.

As described in U.S. Pat. No. 4,653,865, it is of particular importance to maintain a constant liquid crystal layer thickness in thin TN displays (Twisted Nematic) and STN displays (Super Twisted Nematic), and especially when the twist angle in the latter case amounts to 270° or more. A constant thickness of the liquid crystal layer has become an increasingly important requirement for TN and STN displays, since to increase the switching speed, there is a trend towards ever thinner liquid crystal layers, even below 4 $\mu$m. Such displays do not operate in the waveguide mode, and the optical transmission is highly sensitive to small thickness variations.

Another aspect of the problem is how to maintain the plates parallel over the entire display surface, and how to cope with the problem of display rigidity. Changes in the plate spacing due to mechanical stresses and/or temperature may lead to macroscopic flow of the liquid crystal material, which in turn may damage the orientational layers on the inside of the plates. A reduction of the plate spacing may even entail local short-circuiting of the display, and the risk of this occurring increases as the initial plate spacing of the liquid crystal display decreases.

It is true that a TN cell may often return to its normal optical state after an applied external pressure, such as a thumb pressure, has been removed. Normally, this also applies to an STN display, provided the twist angle is not too large, say for twist angles of 180°–200°, but not for larger twist angles, for example of 270°, where the pressure deformation causes a change in the helix structure which may easily become irreversible.

At best, realignment may then be achieved by heating and subsequent cooling of the display and/or by applying an electric field.

To conclude, an STN display having a high twist angle may thus be easily damaged if subjected to external pressure.

Damage caused by mechanical pressure on smectic displays containing ferroelectric (FLC) or antiferroelectric (AFC) liquid crystals is a major problem today as discussed e.g. in a review by S. T. Lagerwall, N. A. Clark, J. Dijon and J. F. Clerc, Ferroelectrics, Vol. 94, 3, 1989. Irrespective of the nature of the specific smectic material, all smectic displays where the layers are not parallel to the cell plates, are extremely sensitive to plate deformations and, hence, are sensitive to shocks.

Smectic displays use a completely different mechanism which limits the permissible deformation as compared with the TN and STN cases. Generally, smectic displays are considerably more sensitive to shocks than corresponding nematic ones. In a first approximation, the layers are standing perpendicular to the glass plates (ideal upright bookshelf geometry), but in a more detailed model, the layers are most often angled with respect to the glass plates in a so-called chevron structure. The structure is known as a QBS structure (Quasi Bookshelf Structure) when the angle of the layers to the normal of the plates is very small. Both the chevron and the QBS structure are extremely sensitive to pressure, and for both FLC and AFLC, the order of the layer structure is damaged by direct application of thumb pressure.

Normally, a chevron structure cannot be realigned without heating, whereas a QBS structure not excessively deformed can be realigned by application of a moderate AC field. Beyond a certain deformation limit, the layer order however becomes irreversibly ruined, as in the chevron case. The display then becomes unusable.

To achieve a liquid crystal cell having a well-defined layer thickness over a relatively large surface, it is known from U.S. Pat. No. 4,150,878 (filed in the name of Barzilai et al. in 1978) to use prestressed 3-mm glass plates with a plurality of spacers or supporting points distributed in the cavity. The function of the spacers primarily is to provide a uniform layer thickness over the entire surface, i.e. good surface parallelism. In a first example, use is made of cylindrical spacers having a diameter of 50 µm distributed with a mutual spacing of 0 mm, which is said to result in a surface parallelism with a 0.1 µm–0.6 µm tolerance over a surface of 10 cm×10 cm. In a second example in the same document, use is made of spacers having a diameter of 0.1 mm with a mutual spacing of 1 mm, which is said to give a surface parallelism with a 0.2 µm tolerance. These tolerances are however insufficient and unacceptable for today's liquid crystal displays (neither STN nor FLC existed in 1978). Moreover, the spacers of this known screen do not result, as will be explained in more detail below, in a pressure-insensitive display. Furthermore, both the 3-mm plate thickness and the spacer diameters are unacceptable in commercial contexts.

EP-A2-0 407 993 (priority year 1989, and applicant Hoechst AG) describes a method for making an LCD cell. To achieve high uniformity of layer thickness, uniformly distributed spacers are etched in one glass plate. This document does not contain any indication about the deformation properties of the cell, in addition to an unconfirmed statement that the cell is "mechanisch sehr stabil". The cell is however described in Rieger et al. Proc., SID Conference, 6–10 May 1991, Anaheim, USA. Since it has also been shown at different conferences, its mechanical properties are well-known. From the last-mentioned article and from public demonstrations, it appears that the cell is easily deformed by thumb pressure. From both the EP document and said article appears that the plate thickness is 0.5 mm, the spacers having a size of about 20 µm and being distributed with a spacing of 600 µm.

The displays hitherto manufactured and demonstrated thus are not mechanically rigid or shock-resistant in that a mechanical pressure, for example thumb pressure, applied locally on the protective glass deforms this and causes both optical changes and flow of material in the cell. This is a general problem in liquid crystal cells, and especially in smectic liquid crystal cells, whose development towards technologically high-potential FLC and AFLC displays has been hampered thereby.

The most direct approach towards obtaining a pressure-insensitive display—using thick plates, for example in the order of 3 mm or more—is unrealistic for today's thin LCD cells. The maximum thickness used today normally is 1 mm, and thicker plates have completely disappeared in practice. Currently, there are also thicknesses of 0.9 mm, 0.6 mm, 0.5 mm and 0.3 mm, of which the latter dimensions have hitherto been used only for very small displays.

The object of the present invention is to obviate these problems encountered in currently used liquid crystal cells, especially cells having a relatively large active surface.

A main object of the invention thus is to provide a liquid crystal cell of the type stated by way of introduction, which is essentially insensitive to normally occurring mechanical influence, for example during handling and transportation.

A special object of the invention is to provide a pressure-insensitive cell that is usable for both nematic (TN/ST) and smectic (FLC/AFLC) liquid crystals.

Another object of the invention is to provide a pressure-insensitive cell which also can be manufactured by a reliable and accurate method.

Yet another object of the invention is to provide a pressure-insensitive cell which can be implemented as a display having at least VGA resolution.

A further object of the invention is to provide a pressure-insensitive cell which can be implemented as an antiglare device, a welding shield and the like.

These and other objects and advantages are achieved by means of a liquid crystal cell having the features stated in the independent claims, preferred embodiments being recited in the dependent claims.

SUMMARY OF THE INVENTION

According to the invention, there is thus provided a liquid crystal cell of the type stated by way of introduction, the size and the mutual spacing of the spacers provided in the cavity being so selected in relation to the other design parameters of the cell that pressure insensitivity of the cell is achieved, while at the same time the thickness of the plates is limited and the spacers are not visible to the naked eye.

According to the invention, it is possible to provide a liquid crystal cell implemented as a display, an antiglare device, welder's goggles etc., with an extreme and surprisingly high improvement of the mechanical rigidity and shock-resistance as compared with the prior art described above. For example, the invention can be implemented as an STN display having a pressure resistance which is more than 100 times higher than that of today's displays and which basically means that the display can be designed so as to behave as a completely solid body upon mechanical influence, until it is broken in case it is made of glass.

The invention is based on the insight that several conditions must be satisfied at the same time to achieve the objects stated above, and that it is possible, by a suitable choice of design parameters, to achieve these conditions simultaneously, especially also for very thin liquid crystal layers and by using very thin plates.

In connection with the conception of the present invention, the following two main conditions (i) and (ii) have been formulated which must both be satisfied in order that the liquid crystal layer should not be compressed to an impermissible degree upon pressure application within reasonable limits, i.e. in order to obtain a pressure-insensitive display. The conditions (i) and (ii) must be satisfied independently and are equally important.

(i) The relative compression of the spacers caused by an external pressure on a first of the plates must not exceed a maximum value.

(ii) The maximum deflection of said first plate between the spacers must lie within the same limit.

During the conception of the invention, the following two formulae (1) and (2) have been established, which correspond to the above-mentioned conditions and of which especially formula (2) explains the surprising rigidity improvement achieved also with very thin plates:

$$\frac{\Delta h}{h} = \frac{P}{sE} \leq \frac{\Delta h}{h}\text{max} \qquad (1)$$

wherein h represents the height of the spacers,

Δh represents the change of the spacer height,

P represents an external pressure on a first plate of the cell,

E represents the modulus of elasticity of the spacers, and s represents the degree of surface coverage of the spacers on the first plate, and $$\frac{\Delta d}{d} = \frac{PL^4}{4Eb^3 d} \leq \frac{\Delta d}{d}\max \quad (2)$$

wherein
d represents the thickness of the liquid crystal layer,
Δd represents the maximum deflection of a plate,
L represents the mutual spacing of the spacers,
E represents the modulus of elasticity of the plate (normally being the same as for the spacers), and
b represents the thickness of the plate.

Formula (1) has been established for rectangular spacers, which is the most advantageous, as will be described below.

In addition to the above-mentioned conditions, there are, however, important secondary conditions concerning both the width of the spacers and the plate thickness. These secondary conditions must also be satisfied. In fact, it is trivial from (1) and (2) above that the relative compression of the spacers Δh/h may be infinitely small if the degree of surface coverage s is selected to be sufficiently large, for example if one chooses very wide and very closely packed spacers, and also that the relative deflection of the plate Δd/d can be made as small as desired if the thickness b of the plate is selected to be sufficiently large. In other words, the problem is to provide a pressure-insensitive display having sufficiently small supporting points and a sufficiently small plate thickness. In actual fact, these secondary conditions are highly limitative of the permissible limits for the other design parameters of the display.

In connection with the conception of the invention, the inventors have found that in the case of STN displays, and also in the case of TN displays operating in a so-called first minimum mode, the relative thickness variation of the liquid crystal layer must not exceed 2% if interference with the performance of the display is to be avoided.

Today, STN displays are manufactured, for example, with a resolution of 3 pixels per mm or more, i.e. with a maximum pixel surface of about 300 μm×300 μm, corresponding to the VGA graphics of a 10-inch display. In this case, spacers having a size of 100 μm×100 μm would be unacceptable, since they would not only occupy an unacceptably large portion of the active surface of the display but also even be visible to the naked eye.

To achieve the objects of the invention, spacers of 50 μm×50 μm are however usable, since this size has been found to be a reasonable upper limit, beyond which it is possible to discern inhomogeneities in the display with the naked eye. In actual fact, this limit of 50 μm agrees with a common upper standard limit for the width of the etched insulating grooves surrounding each pixel in liquid crystal displays. In other words, spacers having a maximum width of 50 μm in one direction can be placed in these interspaces outside the active pixels of the display.

As to the secondary condition relating to the size of the spacers, it should be further noted that in those cases where the liquid crystal cell is not divided into pixels, for example for use as a visor, an anti-glare device, a welding shield and the like, it is even more important that the spacers are not visible to the naked eye or can be perceived as inhomogeneities in the cell.

Moreover, it is advantageous if the spacers have a minimum light scattering effect, i.e. an absorption and a refractive index corresponding to the liquid crystal and a transparent covering plate.

As to the secondary condition relating to the plate thickness, the invention makes use of a liquid crystal cell in which at least one plate (which should withstand external pressure) has a thickness not exceeding 1 mm, which is a reasonable value for the upper limit for any commercial glass intended for LCD purposes. For greater glass thicknesses, such as a 3-mm thickness as in the above-mentioned U.S. Pat. No. 4,150,878, it is also impossible to achieve a sufficiently high accuracy of the crystal layer thickness, since the glass cannot be deformed sufficiently to ensure good engagement.

As mentioned above, it is possible with the invention to achieve an extreme improvement of the mechanical rigidity as compared with known displays. That this improvement is not marginal but quite sensational can be explained not least with reference to formula (2) above, from which it appears that the maximum relative deflection Δd/d between the spacers follows a functional relation having the form $L^4 b^{-3}$. The $L^4$ dependence is represented by a curve which is very flat close to origin.

As an illustrative example, a comparison can be made with the cell described in the above-mentioned EP 0 407 993, where L=600 μm and B=0.5 mm. If, according to the invention, one instead chooses L=300 μm (reduction by a factor ½) and b=1 mm (increase by a factor 2), then Δd is reduced by a factor $2^7$=128 as compared with the known cell.

This $L^4 b^{-3}$ dependence also gives another highly essential property for the display application, namely that the higher the resolution (lower L), the more rigid the display, while at the same time still thinner plates can be chosen without departing from condition (2), since L4 decreases more rapidly than $b^{-3}$ when both L and b decrease, and this at the same time as the condition (1) can be satisfied with acceptable values for the width of the passive surface between the pixels. This means that the technique according to the invention permits the production of small, extremely thin and light-weight, high-resolution graphic displays, which is of interest in, inter alia, the horological and optical industries, for example in optical instruments containing many liquid crystal components in cascade. In such applications, it is often desirable to have separate components that are so thin that even normal handling would make them shock-sensitive if they were designed in a conventional fashion.

A reasonable upper limit for the applied external pressure P can be set at 50 atm (≈50*$10^5$N/$m^2$), corresponding to a weight of 50 kg on 1 $cm^2$. When tested, liquid crystal displays produced according to the invention have been found to withstand this and even higher pressures, without exhibiting any altered optical or mechanical properties.

As stated above, the maximum relative deformation of the crystal layer thickness must not exceed 2% in TN and STN cells. Assuming that P=50 atm and E=5*$10^5$N/$m^2$ (varying only slightly for different glass types), it is found from (1) that a degree of surface coverage s>P/(1%*E)=1% is required to avoid excessive compression of the spacers.

As a comparison to this minimum value of 1% for the degree of surface coverage s, we will find, e.g. for a display having a linear pixel width L=300 μm, a plate thickness b=1 mm and rectangular spacers having a width ΔL=50 μm, a degree of surface coverage s=$(50/300)^2$=2.8%, guaranteeing that the compression of the spacers lies within the permissible limit according to formula (1) above. The relative deflection (Δd/d) between the plates according to (2) above becomes, with P=50 atm and d=5 μm, equal to 2*$10^{-4}$ μm, which also lies well within the permissible limit of 2% of 5 μm=0.1 μm. The thickness of 5 μm here corresponds to the value which today is a standard value for STN displays.

As compared with the prior art, it is possible to calculate the corresponding value of the degree of surface coverage s for the spacers of the cell in the above-mentioned EP-A2-0 407 993 as follows: s=(20 µm/600 µm)²≈0.1%, which corresponds to a 10% relative compression Δh/h of the spacers at p=50 atm and, hence, is far above the permissible value according to formula (1) and therefore obviously is completely unacceptable if the cell is to be considered shock-resistant and mechanically stable.

Similarly, an unacceptable s-value is obtained for the cell in U.S. Pat. No. 4,150,878 where L=400 µm and the spacer diameter=100 µm gives s=(100/400)²≈0.06%, yielding a display which is easily deformable despite the large glass thickness of 3 mm.

As opposed to this known technique, it is possible by the invention to produce super-thin, super-light, but at the same time super-strong displays for use, for example, in a completely new generation of clock displays. In such a display, it is an aim at present to have up to 20 pixels per mm. If, according to the invention, one chooses L=50 µm and ΔL=10 µm (width of the spacers), a degree of surface coverage s=(10/50)²=4% is obtained, which is well above the permissible limit values. If at the same time one chooses a plate thickness b that is as small as 0.1 mm, a deflection Δd equal to $10^{-4}$ µm is obtained at 50 atm, which satisfies (2) extremely well.

As mentioned by way of introduction, smectic displays (FLC or AFLC) have a totally different mechanism which limits the permissible deformation as compared with TN and STN displays. The optically permissible deformation is at least 5 times greater than in the STN case, but the mechanical one is about 10 times less. This latter deformation thus becomes decisive. From a calculation based on a simplified model which overrates the sensitivity of the smectic cell because no regard is paid to relaxation and flow, and in which the deflection is described as a spherical cap having a surface radius R, it is found that the smectic liquid crystal layers should be deformed irreversibly for Δd/d=4d/R. For R=0.5–1 cm, corresponding approximately to thumb pressure, and d=2 µm, corresponding to the thinner layer required by an FLC or AFLC cell, the above-mentioned expression gives a relative deformation Δd/d of about 0.1%, corresponding to a maximum deflection Δd of 0.002 µm. This shows that smectic cells are considerably more sensitive to shocks than corresponding nematic cells, leading to a lower limit value in formula (2) above. Another minimum limit value of the degree of surface coverage s is also obtained as compared with the nematic case. Assuming that the standard load for a "shockproof test" of FLC is set at 10 atm (corresponding to 10 kg over one $cm^2$) according to the European Felicita programme, an s-value of 2% is obtained, which thus is the minimum permissible degree of surface coverage of the spacers if the cell is to satisfy (1) and thus be mechanically stable.

BRIEF DESCRIPTION OF THE DRAWINGS

The invention will now be described in more detail in some non-limitative embodiments with reference to the accompanying drawings.

DESCRIPTION OF PREFERRED EMBODIMENTS

Reference is now first made to the Table below, summarising the results from experiments conducted, which confirm that the invention provides highly shock-resistant liquid crystal cells. The surface coverage s has been varied between about 0.1% and 4%, at the same time as the values of d, L and b have been such that condition (2) has been satisfied in all cases. The liquid crystal layer thickness has been selected to be d=5 µm for STN and d=2 µm for FLC, and the test pressure P has been of the order of 50 atm for STN cells and 10 atm for FLC cells.

Tests Nos. 8–11, conducted only for FLC displays, will be discussed in more detail below. The elongate spacers used therein are however usable also for nematic displays.

For s-values around 1%, the variation in experimental results has been relatively large, for which reason we feel that s must at any rate exceed 1%. The most advantageous option seems to be where s is between 2% and 4%. There would be no reason to choose s greater than 4%, at least for STN displays.

| Test No | b (mm) | L (µm) | ΔL1*ΔL2 (µm*µm) | s (%) | Results |
|---|---|---|---|---|---|
| 1 | 1 | 1000 | 32 × 32 | 0.1 | Poor |
| 2 | 1 | 500 | 20 × 20 | 0.16 | Poor |
| 3 | 1 | 320 | 25 × 25 | 0.6 | Doubtful |
| 4 | 1 | 500 | 40 × 40 | 0.7 | Doubtful |
| 5 | 1 | 300 | 50 × 50 | 2.8 | Good |
| 6 | 1 | 100 | 20 × 20 | 4 | Good |
| 7 | 1 | 100 | 20 × 20 | 4 | Good |
| 8 | 1 | 500 | 40 × 100 | 1.6 | Good |
| 9 | 1 | 500 | 40 × 250 | 4 | Good |
| 10 | 1 | 500 | 40 × 500 | 8 | Good |
| 11 | 1 | 500 | 20 × 500 | 4 | Good |

The tests in the above Example that satisfy both the condition of s (i.e. condition (1)) and condition (2) have thus confirmed that a pressure-insensitive cell can be achieved. In the test cells that have been designed and been filled with smectic material, no essential difference has been noted between FLC and AFLC regarding the pressure threshold for irreversible deformation. On the other hand, an upright bookshelf structure is easier to realign in both cases than is a chevron structure after a minor deformation.

Figure 6:
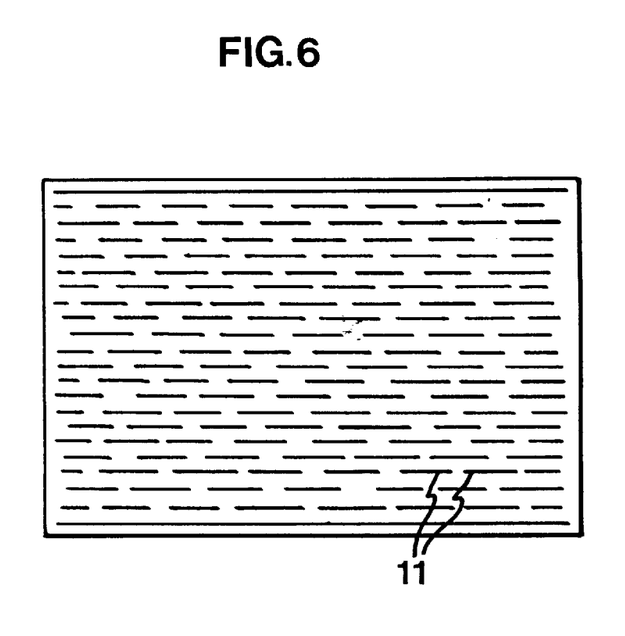
FIG. 6 shows the principle of the use of elongate spacers.

In particular, but not exclusively for smectic cells, it may be preferred to use spacers which do not have a square, rectangular or cylindrical cross-section, but instead extremely elongate spacers whose width transversely of the longitudinal direction, in compliance with the above-mentioned conditions, must not exceed 50 µm in order that the spacers should not become visible. Tests Nos. 8–11 are performed on smectic cells. In addition to their stabilising function, such elongate spacers have two functions which are especially important if the smectic layers have a chevron structure, and especially if the molecules have a high pretilt angle at the surface. The first function, which applies to both nematic and smectic cells, is to guide the liquid flow when filling the cell, such that the general direction of the molecules is along the supporting lines. In a smectic cell, the smectic layers will then form transversely of the supporting lines. The second function, which applies to smectic cells, is to prevent transport of material within the cell when applying electric fields. Accompanying FIG. 6 shows, not-to-scale, the principle and the arrangement of such elongate spacers.

Figure 1:
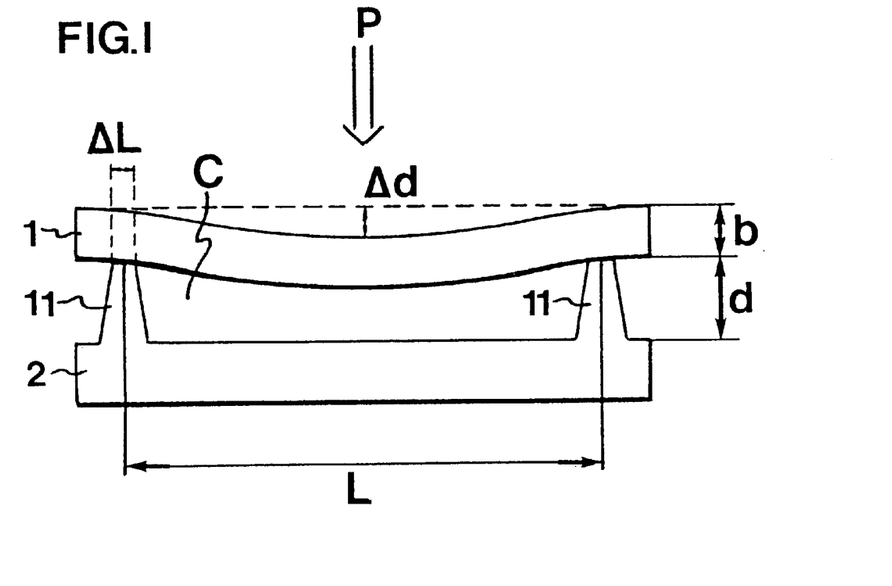
FIG. 1 is a schematic, not-to-scale, longitudinal section of a cell illustrating the deflection upon application of an external pressure.

FIG. 1 schematically illustrates in cross-section a liquid crystal cell loaded by an external pressure P and comprising two parallel plates 1 and 2, hereinafter referred to as upper plate 1 and lower plate 2, respectively, which define an inner cavity C containing a liquid crystal layer. The thickness of the plate 1 is designated b and the unaffected thickness of the cavity C is designated d. Generally, the thickness of the second plate 2 may, according to the invention, be equal to or optionally greater than the thickness of the first plate 1. Any deflection takes place between spacers 11, which are formed integral with the lower plate 2 and arranged with a mutual spacing L. The width of the spacers 11 is designated ΔL, and the maximum deflection of the upper plate 1 between the spacers 11 is designated Δd.

As discussed above, two conditions must be satisfied in order to obtain a pressure-insensitive cell. First, according to condition (2), the maximum deflection Δd caused the pressure P must not be too great. Second, according to condition (1), the spacers 11 must not themselves be excessively compressed by the pressure P. If the height of the spacers is designated h (equal to the liquid crystal layer thickness d in FIG. 1) and their pressure-induced compression is designated Δh in accordance with condition 1, then it is possible for small deformations to use the following expressions for calculating the relative compression for different shapes of the spacers, where E is the modulus of elasticity of the spacers, which normally is equal to E of the plates 1, 2, and where $\bar{s}$ is the degree of optical or projected surface coverage of the spacers on the plate that is subjected to the pressure P:

$$\frac{\Delta h}{h} = \left(\frac{P}{\pi \bar{s} E}\right)^{1/2} \text{ for spherical spacers,}$$

$$\frac{\Delta h}{h} = \left(\frac{3P}{\bar{s} E}\right)^{2/3} \text{ for cylindrical spacers, and}$$

$$\frac{\Delta h}{h} = \frac{P}{\bar{s} E} \text{ for rectangular spacers.}$$

Figure 2:
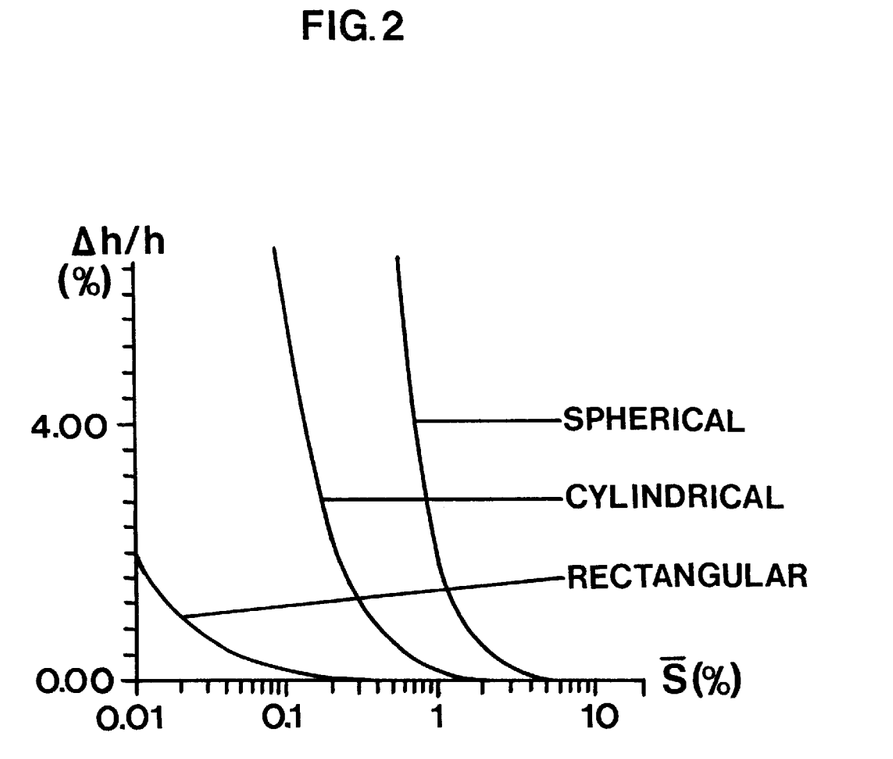
FIG. 2 is a diagram which illustrates, for different types of spacers, the relative compression of the spacers as a function of their degree of surface coverage s.

So far, we only discussed the case of rectangular spacers, and s meant the projected, "optical" surface coverage as well as the load-supporting surface coverage. For other spacer shapes, the projected surface coverage $\bar{s}$ will be different from s. From these formulae, which are illustrated in the diagram of FIG. 2 by respective curves, it clearly appears that for given values of $\bar{s}$, P and E, minimum compression is obtained for rectangular spacers, which thus are preferred.

Figure 3A:
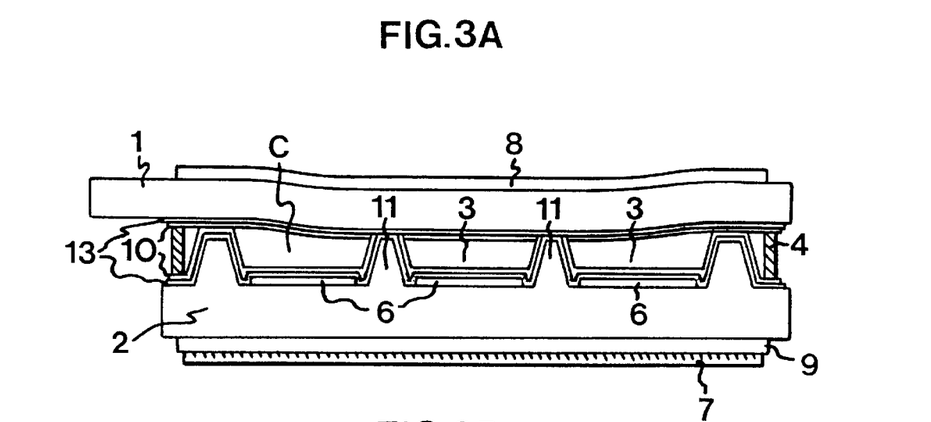
FIGS. 3A and 3B are two schematic not-to-scale cross-sections of a liquid crystal display according to one embodiment of the invention.
Figure 3B:
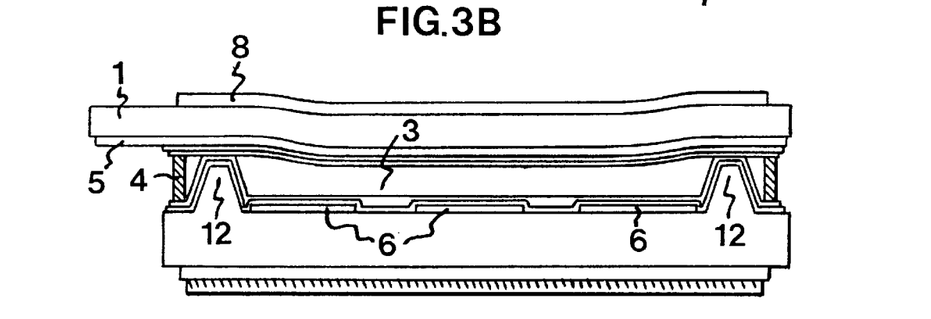
Figure 4:
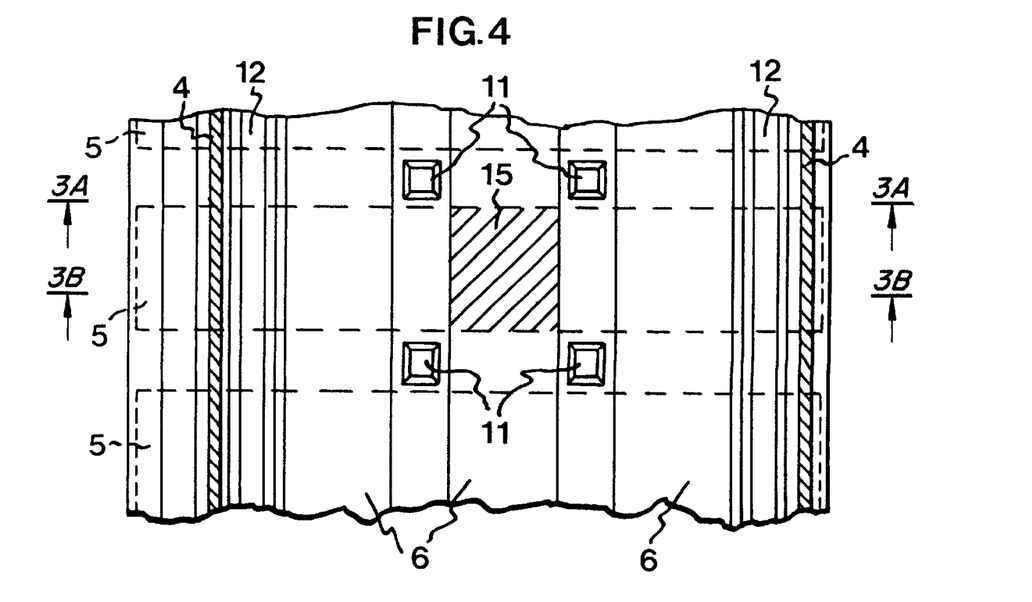
FIG. 4 is a top plan view of the display in FIGS. 3A and 3B.

Reference is now made to the display shown in FIGS. 3A, 3B and 4, where the same reference numerals are used as in FIG. 1. The display comprises a transparent upper or front plate 1 and a lower or rear plate 2. The plates 1, 2 are preferably made of glass, but may also be made of other materials, such as quartz, polymer etc. An edge seal 4 is arranged between the peripheries of the plates 1, 2 to hermetically interconnect the plates 1, 2 and to enclose a liquid crystal layer 3 therebetween. In the illustrated embodiment, the plates 1, 2 are provided with electrically conductive, intersecting electrode layers 5, 6 for applying electric fields over the liquid crystal 3, at least the upper layers 5 being transparent. The lower layers 6 may be either transparent or reflective. Possible designs and choices of material for these layers require no further explanation, since they are known to those skilled in the art. In the top plan view of FIG. 4, the hatched square 15 between the four central spacers 11 forms a pixel.

If the cell is to operate in the reflective state, a reflector 7 may be arranged on the rear side of the display as an alternative to the lower plate 2 or the lower electrodes 6 being reflective.

A polarising film 8 is arranged on the outside of the upper plate 1, and depending on the application, a second polarising film 9 may be placed between the liquid crystal 3 and the reflector 7. Moreover, orienting layers 10 are provided on both plates 1, 2 closest to the liquid crystal 3 to achieve an initial orientation thereof. The choice of material and the orientation of polarisers and orienting layers are known concepts to those skilled in the art and may, for example, be produced as described in U.S. Pat. No. 4,653,865.

Fixed in the cavity between the plates 1, 2 are a plurality of spacers 11, which in this design are produced by etching the lower plate 2. The above-described parameter degree of surface coverage s then corresponds to the quotient between the sum of the upper engagement surfaces of the spacers 11 on the plate 1 and the entire surface of the plate 1 over which the spacers 11 are distributed.

If the spacers 11 are placed between the electrode layers 5, 6, then at least one plate should have an insulating layer 13, for example of silica.

In the illustrated embodiment, special peripheral spacers 12 are arranged in the peripheral portions of the display and are made by the same technique as the central spacers 11. The peripheral spacers 12 (also illustrated in FIG. 5) have an elongate shape and orientation contributing to guide the liquid crystal flow during manufacture, with a view to ensuring a uniform flow and avoiding orientational defects in the liquid crystal.

Figure 5:
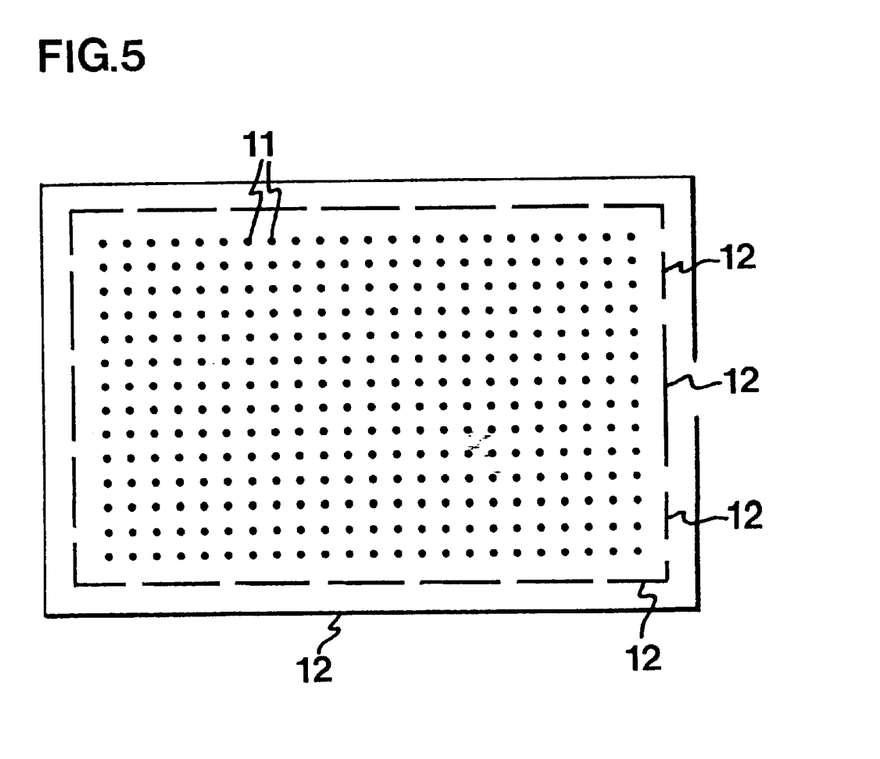
FIG. 5 is a schematic top plan view of an entire cell, also illustrating an example of the use of peripheral spacers.

The peripheral spacers 12 have the even more important function of preventing cavity or void formation in the active, central part of the display at low temperatures. Such voids often form when filling liquid crystal cells, which takes place under vacuum, but in actual fact constitute a general problem in all liquid crystals displays. In particular, these may during transport be exposed to very low temperatures, in which case the considerable volume contraction of the liquid crystal as compared with that of the glass may easily lead to void formation in the liquid. Such voids may remain during an excessively long time after heating to room temperature.

Since such a void formation is counteracted by capillary forces and hence requires a surface energy which is the greater the smaller the radius of curvature of the void, it is possible by means of such peripheral spacers to localise the void formation to areas outside the active area of the display.

The width of the peripheral spacers and their mutual spacing should be significantly greater than the width of the central spacers and their mutual spacing, respectively, as shown in FIG. 5. Such a relatively larger distance between the peripheral spacers allows, like the increased spacer height as mentioned above, the voids to have a larger radius of curvature in the peripheral area as compared with the central part of the distance, where the spacers are located closer to each other. Moreover, considering that, to be formed, such voids require a surface for nucleation, the greater width of the peripheral spacers means that the gaps therebetween are delimited by relatively larger surfaces, on which the nucleation thus tends to take place. An increased spacer height in the peripheral area further contributes to permit the radius of curvature of the voids to be greater than within the active area of the display, thereby lowering the energy of the void.

The large gap between the peripheral spacers also aims to locally facilitate flow of material upon temperature changes.

By tests conducted with temperature cycling down to −40° C., we have found that the peripheral spacers, optionally arranged in double outer rows, are efficient for collecting and rendering harmless thermally-formed voids and for suppressing the formation thereof over the active area of the display.

Our tests have shown that even a small difference in spacer height of the order of 10%–20%, combined with a relatively large distance between the peripheral spacers, as in FIG. 5, is effective for localising void formation to precisely this area.

According to the invention, it is generally desirable, in order to obtain a rigid display, to hold together the cells, i.e. the plates, by means of a negative pressure, for example in the order 0.1–0.5 atm, this negative pressure being produced when filling the cell and ensuring that the plates in the finished cell are maintained in good engagement with the spacers. It is conceivable to produce such a joining force also in other ways, for example by applying a binder or any other type of joint on the spacers.

What is claimed is:

1. A nematic liquid crystal cell, comprising two electrode-equipped (5, 6) plates (1, 2) which are arranged at a predetermined distance from each other to define an inner cavity (C) and of which at least a first plate (1) is transparent and has a thickness b which does not exceed 1 mm; and a modulus of elasticity E; a liquid crystal layer (3) sealed in said cavity and containing nematic material and having a thickness d corresponding to a height of the cavity; and spacers (11) fixed in said cavity and having a height h corresponding to the thickness d of said layer, said spacers being distributed over the cavity with a spacing L and having substantially the same modulus of elasticity E as said first plate, characterised in that the spacers (11), at least in one direction, have a width not exceeding 50 μm; that a degree of surface coverage s by supporting areas of said spacers (11) on said first plate (1) exceeds or is equal to 1%; and that the value of L is so selected in dependence on current values of d and b that, when applying a pressure P on said first plate (1), a maximum relative deflection Δd/d, caused by said pressure P, of said first plate between the spacers satisfies the following condition:

$$\frac{\Delta d}{d} = \frac{PL^4}{4Eb^3 d} \leq G1 \quad (A)$$

where G1 is equal to or lower than a value of the following expression (B), representing a relative compression of the spacers (11), caused by said pressure P, for a case where the degree of surface coverage s assumes its minimum value of 1%:

$$\frac{\Delta h}{h} = \frac{P}{sE}. \quad (B)$$

2. A nematic liquid crystal cell as claimed in claim 1, characterised in that said upper deformation limit G1 is equal to or less than 2%, preferably 1%.

3. A nematic liquid crystal cell as claimed in claim 2, characterised in that the liquid crystal layer (3) has STN structure.

4. A nematic liquid crystal cell as claimed in claim 1, characterised in that the liquid crystal layer (3) has STN structure.

5. A nematic liquid crystal cell as claimed in claim 4, characterised in that said STN structure has a twist angle exceeding 200°.

6. A nematic liquid crystal cell as claimed in claim 1, characterised in that the height h of the spacers (11) is in the range of 0.5–20 μm, preferably 1–10 μm.

7. A liquid crystal cell as claimed in claim 1, characterised in that the degree of surface coverage s by the supporting areas of the spacers (11) on the first plate is 2–4%.

8. A liquid crystal cell as claimed in claim 1, characterised in that at least the first glass plate (1), preferably both plates (1, 2), has a thickness b not exceeding 0.5 mm.

9. A liquid crystal cell as claimed in claim 1, characterised in that a force holding together said plates (1, 2) exists in the cell over the active area thereof.

10. A liquid crystal cell as claimed in claim 9, characterised in that a negative pressure prevails in said cavity for providing said force holding together said plates.

11. A liquid crystal cell as claimed in claim 9, characterised in that the spacers (11) are adhesively connected to at least one plate (1) for providing said force holding together said plates.

12. A liquid crystal cell as claimed in claim 1, characterised in that at least some of the spacers (11), which in one direction have a width not exceeding 50 μm, have a substantially larger extent transversely of said direction to form elongate spacers.

13. A liquid crystal cell as claimed in claim 1, characterised in that the liquid crystal cell, in addition to said spacers (11) which are distributed in the cavity over the active area of the cell, comprise a plurality of peripheral spacers (12) arranged in spaced-apart relationship in the periphery of the cell and having a transverse extent which is substantially larger than that of the first-mentioned spacers (11) in the active area of the cell.

14. A liquid crystal cell as claimed in claim 13, characterised in that the peripheral spacers (12) are elongate and arranged with their short sides facing each other in spaced-apart relationship.

15. A liquid crystal cell as claimed in claim 1, characterised in that the liquid crystal cell, in addition to said spacers (11) which are distributed in the cavity over the active area of the cell, comprise a plurality of peripheral spacers (12) arranged in the periphery of the cell and having a height exceeding the height h of the first-mentioned spacers in the active area of the cell.

16. A liquid crystal cell according to claim 15, characterised in that the peripheral spacers (12) are elongate and arranged with their short sides facing each other in spaced-apart relationship.

17. A liquid crystal cell as claimed in claim 1, characterised in that the spacers (11) have rectangular cross-section.

18. A liquid crystal cell as claimed in claim 1, characterised in that the plates (1, 2) and the spacers (11, 12) are made of glass.

19. A liquid crystal cell as claimed in claim 1, characterised in that the spacers (11, 12) are provided by etching at least one (2) of said plates (1, 2).

20. A liquid crystal cell as claimed in claim 1, characterised in that the cell is designed as a display comprising a plurality of pixels arranged in spaced-apart relationship, the spacers (11) being arranged between said pixels.

21. A smectic liquid crystal cell, comprising two electrode-equipped (5, 6) plates (1, 2) which are arranged at a predetermined distance from each other to define an inner cavity (C) and of which at least a first plate (1) is transparent and has a thickness b not exceeding 1 mm, and a modulus of elasticity E; a liquid crystal layer (3) sealed in said cavity and containing smectic material and having a thickness d corresponding to a height of said cavity; and spacers (11) which are fixed in said cavity and the height h of which corresponds to the thickness d of said layer, said spacers being distributed over the cavity with a spacing L and having substantially the same modulus of elasticity E as said first plate, characterised in that the spacers (11), at least in one direction, have a width not exceeding 50 μm; that a degree of surface coverage s by the supporting areas of said spacers (11) on said first plate (1) exceeds or is equal to 2%; and that the value of L is so selected in dependence on current values of d and b that, when applying a pressure P on said first plate (1), a maximum relative deflection Δd/d, caused by said pressure P, of said first plate between said distances satisfies the following condition:

$$\frac{\Delta d}{d} = \frac{PL^4}{4Eb^3 d} \leq G2 \quad (A)$$

where G2 is equal to a value of the following expression (B), representing a relative compression of said spacers caused by said pressure P, for a case where the degree of surface coverage s assumes its minimum value of 2%;

$$\frac{\Delta h}{h} = \frac{P}{sE}. \quad (B)$$

22. A smectic liquid crystal cell as claimed in claim 21, characterised in that said upper deformation limit G2 is equal to or less than 0.1%.

23. A smectic liquid crystal cell according to claim 22, characterised in that the liquid crystal layer (3) contains a ferroelectric liquid crystal (FLC).

24. A smectic liquid crystal cell according to claim 22, characterised in that the liquid crystal layer (3) contains an antiferroeletric crystal (AFLC).

25. A smectic liquid crystal cell as claimed in claim 21, characterised in that the liquid crystal layer (3) contains a ferroelectric liquid crystal (FLC).

26. A smectic liquid crystal cell as claimed in claim 21, characterised in that the liquid crystal layer (3) contains an antiferroelectric liquid crystal (AFLC).

27. A smectic liquid crystal cell as claimed in claim 21, characterised in that the height h of the spacers (11) is in the range of 0.5–20 μm, preferably 1–2 μm.

* * * * *